United States Patent [19]
Bell

[11] Patent Number: 4,789,180
[45] Date of Patent: Dec. 6, 1988

[54] KNOCK-DOWN UTILITY CART

[76] Inventor: Robert R. Bell, 804 Patricia, Ann Arbor, Mich. 48103

[21] Appl. No.: 34,338

[22] Filed: Apr. 3, 1987

[51] Int. Cl.$^4$ ............................................. B62B 1/04
[52] U.S. Cl. ................................ 280/652; 280/47.26; 280/47.33; 280/47.37 R
[58] Field of Search ................. 280/43.1, 63, 47.24, 280/47.26, 47.33, 47.37 R, 47.35, 47.30, 652

[56] References Cited
U.S. PATENT DOCUMENTS

| | | | |
|---|---|---|---|
| 2,723,130 | 11/1955 | Andrews | 280/47.33 |
| 2,778,654 | 1/1957 | Gottlieb | 280/47.24 |
| 2,979,338 | 4/1961 | Dwyer | 280/47.3 |
| 2,984,499 | 5/1961 | Humphrey | 280/47.37 R |
| 2,992,834 | 7/1961 | Tidwell et al. | 280/47.3 |
| 3,222,100 | 12/1965 | Lindzy | 280/652 |
| 3,860,254 | 1/1975 | Wegener | 280/652 |
| 4,153,264 | 5/1979 | Pfister | 280/47.26 |
| 4,199,170 | 4/1980 | Hubner et al. | 280/641 |
| 4,215,877 | 8/1980 | Pritchett | 280/652 |

FOREIGN PATENT DOCUMENTS
1377898 9/1964 France ............................ 280/47.24

Primary Examiner—David M. Mitchell
Assistant Examiner—Eric D. Culbreth
Attorney, Agent, or Firm—Rhodes and Boller

[57] ABSTRACT

A utility cart particularly suited for transporting large heavy loads over rough terrain. The cart has a knock-down construction enabling it to be conveniently disassembled for storage and subsequently re-assembled for use. The knocked-down parts are a basket, two wheels, and a combination operating handle and strut assembly. The basket is fabricated from tubular electrical conduit to comprise a rectangular perimeter frame whose longer sides are spanned by a series of transverse members which are of depressed shape to form the sides and bottom of the basket. The wheels mount on opposite sides of the basket to provide a road clearance greater than the wheel radius. The operating handle and strut assembly mounts on the basket at one lengthwise end by means of removable pin connections. The strut is operable on the assembly to a stowed position and to a ground-engaging support position. An optional removable liner for the basket is also disclosed.

18 Claims, 3 Drawing Sheets

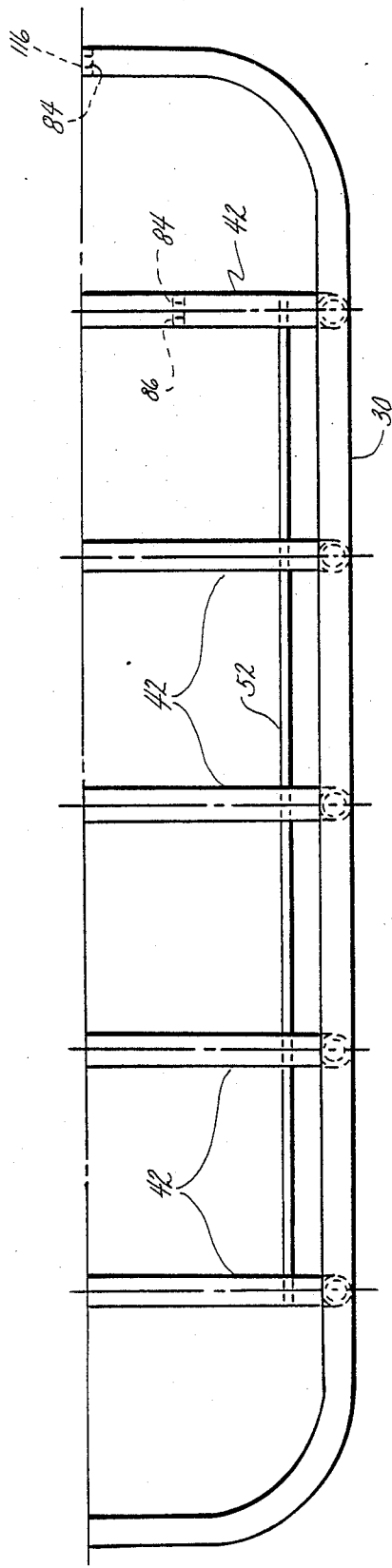
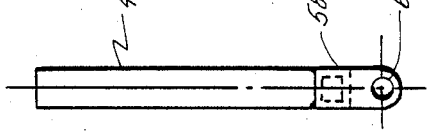
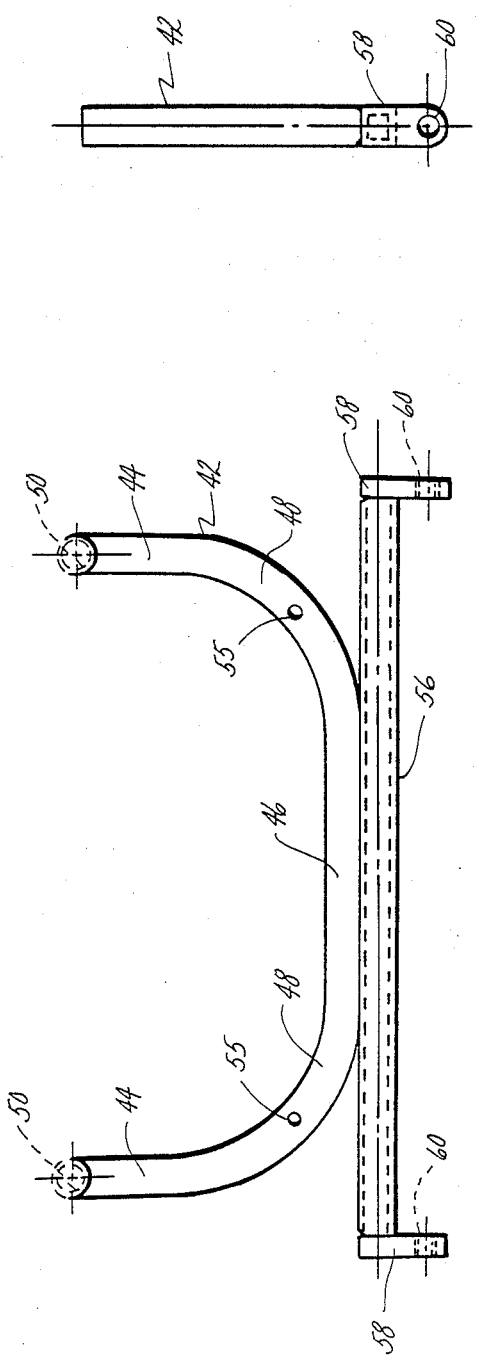

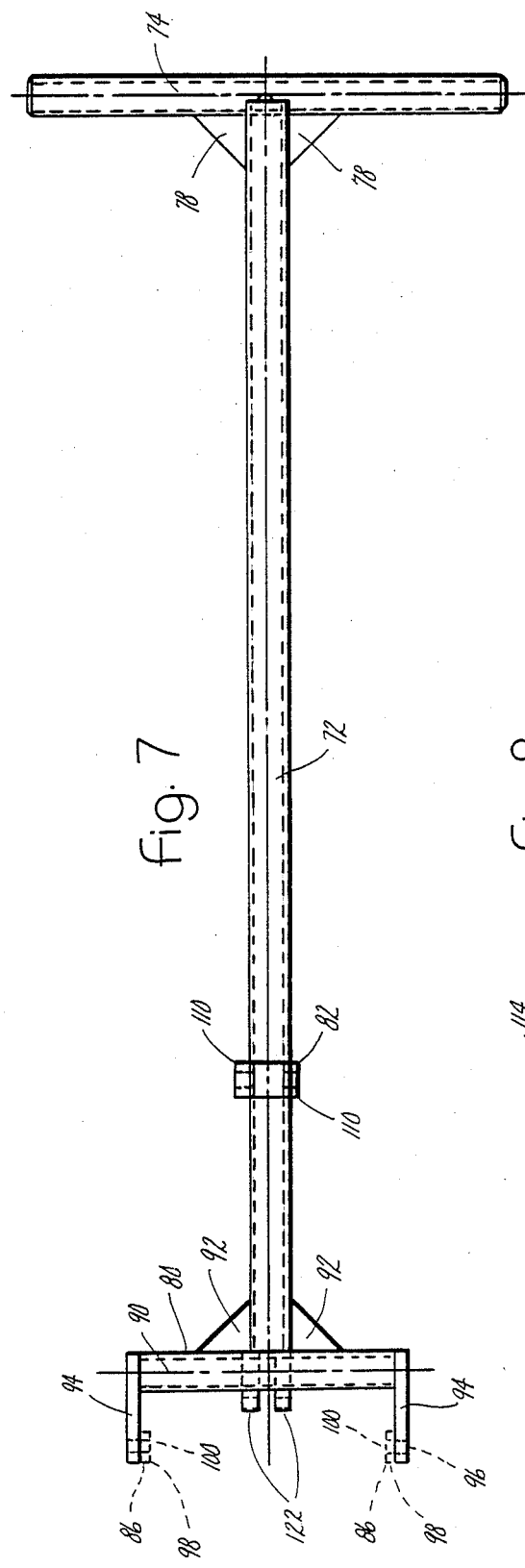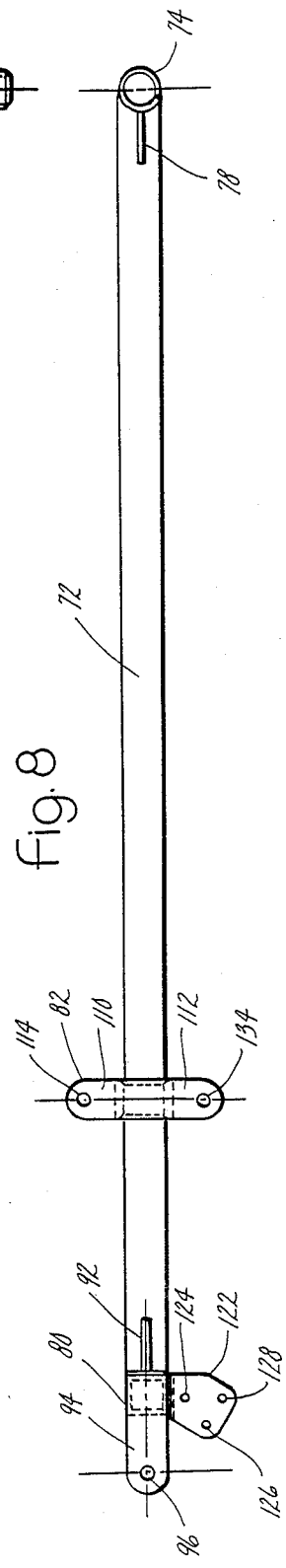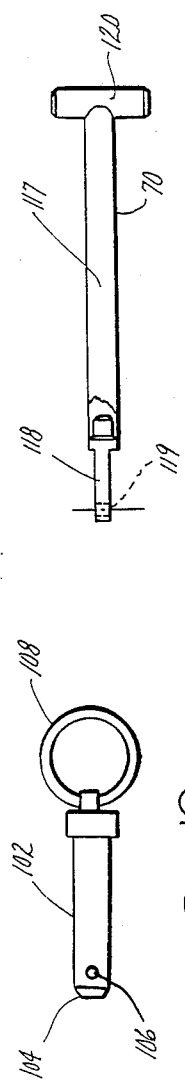

KNOCK-DOWN UTILITY CART

BACKGROUND AND SUMMARY OF THE INVENTION

This invention relates generally to wheeled utility carts. More particularly it relates to a sportsman's cart which is capable of transporting large heavy loads, such as freshly killed game, over rough terrain, yet is of knock-down construction for convenient storage and subsequent re-assembly.

Examples of other utility carts are shown in U.S. Pat. Nos. 2,979,338; 2,992,834; 3,222,100; 3,860,254; and 4,215,877. While these prior carts show the general concept of fold-down or knock-down construction, the present invention represents an improvement because of the unique organization and arrangement of its knock-down parts and the manner in which they assemble and disassemble. Moreover the invention is beneficial in its efficient use of materials to fabricate the various parts and the ease with which they can be assembled and disassembled. Still further, the invention is advantageous because the cart can carry a large load over rough terrain, and it is strong and durable. The cart possesses an attractive appearance as well.

The foregoing features, advantages, and benefits of the invention will be seen in the ensuing description and claims which should be considered in conjunction with the accompanying drawings. The drawings disclose a preferred embodiment of the invention in accordance with the best mode contemplated at the present time in carrying out the invention.

BRIEF DESCRIPTION OF THE DRAWINGS

FIG. 4 is a top plan half view of a part of the cart shown by itelf.

FIG. 5 is a full elevational view of one of the members shown in half view in FIG. 4, illustrating additional parts assembled to it.

FIG. 6 is a side elevational view of FIG. 5.

FIG. 7 is a top plan view of another part of the cart shown by itself.

FIG. 8 is an elevational view of FIG. 7.

FIG. 9 is a top plan view of a further part shown by itself.

FIG. 10 is a top plan view of still another part shown by itself.

DESCRIPTION OF THE PREFERRED EMBODIMENT

Figure 1:
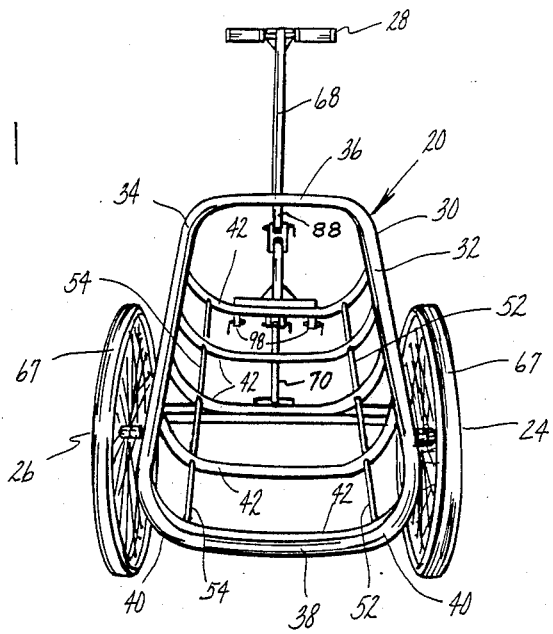
FIG. 1 is is a rear perspective view of a utility cart embodying principles of the invention.
Figure 2:
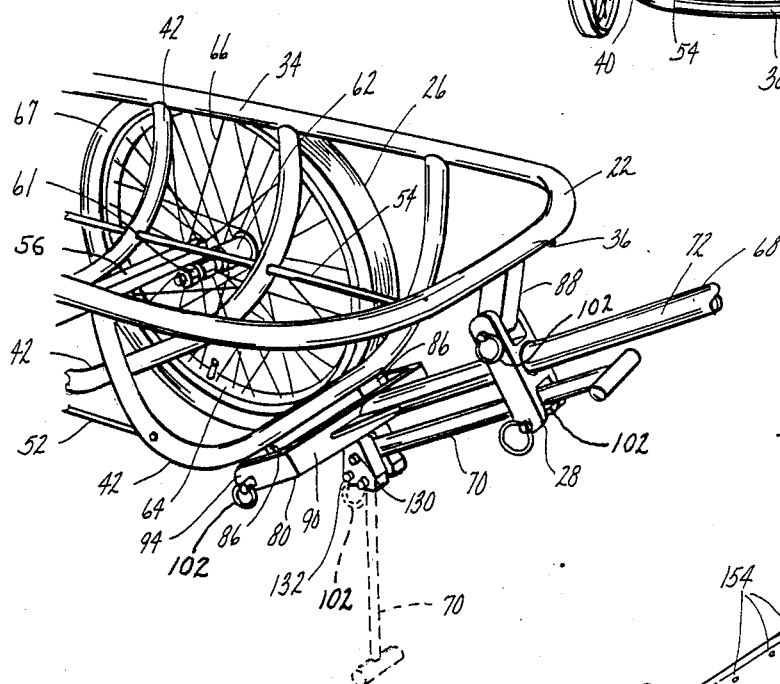
FIG. 2 is a fragmentary perspective view of the cart from the right front, on a slightly larger scale than the scale of FIG. 1.
Figure 3:
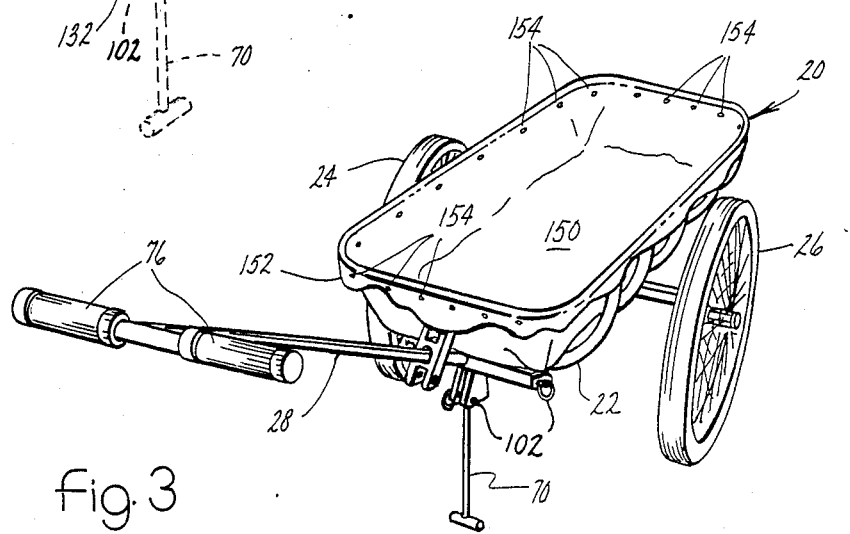
FIG. 3 is a perspective view from the left front further showing an optional accessory item in use with the cart.

FIGS. 1, 2, and 3 illustrate the general organization and arrangement of a utility cart 20 embodying principles of the present invention. Cart 20 is of a knock-down construction comprising the following principal parts: a basket 22; a pair of wheels 24, 26; and a combination operating handle and strut assembly 28. The wheels removably mount on the basket at opposite sides. The combination operating handle and strut assembly removably mounts at one end of the basket. The cart can be either pushed or pulled via the operating handle depending on the desire of the person operating it.

Details of basket 22 are seen in FIGS. 1-6. The basket comprises a continuous rectangular perimeter frame 30 which forms the top rim of the basket. The perimeter frame comprises two longer parallel sides 32, 34 and two shorter parallel sides 36, 38. The longer sides 32, 34 are disposed lengthwise of the cart and the shorter sides 36, 38 are disposed transversely, or widthwise, at the lengthwise ends of the basket.

Advantageously, the perimeter frame is formed from metal tubing, particularly thinwall electrical conduit. Nominal ¾ inch conduit has been found quite suitable. This enables the entire perimeter frame to be fabricated from a single length of conduit, formed to the rectangular shape, and the two confronting ends joined, as by welding. In forming the conduit to the rectangular shape, it is bent into 90 degree curved segments 40 at the four corners of the rectangle.

The bottom and sides of the basket are formed by a series of transverse members 42, also preferably formed of the same type and size conduit as the perimeter frame. The illustrated embodiment incorporates five such members 42, and they are uniformly spaced apart from each other along the length of the basket. A 7.5 inch spacing has been found very suitable. Each member 42 is shaped from a single length of conduit to comprise a pair of parallel end segments 44, an intermediate segment 46 which is perpendicular to end segments 44, and 90 degree curved bend segments 48 which join segment 46 with segments 44.

Joining of members 42 with perimeter frame 30 is accomplished by cutting the ends of each member 42 into generally semi-circular concave shapes 50 and fitting them to substantially a semi-circular portion of the perimeter frame, as perhaps best seen in FIG. 5. The ends of the members 42 are joined to the perimeter frame by any suitable means, preferably welding. The result is a strong construction, but relatively lightweight in comparison to its strength.

Additional rigidity is imparted by means of two straight circular rods 52, 54 which are arranged lengthwise of the cart. Holes 55 are formed in any suitable manner through members 42 at the midpoints of the curved bend segments 48. The holes on the right side are in alignment, and rod 52 passes through them. The holes on the left side are likewise in alignment, and rod 54 passes through them. The two rods are joined to members 42, preferably by welding. Consequently the rods serve to tie the transverse members together near the bottom of the basket. While the rods impart addition stiffening to the basket, they are also useful for fabrication of the basket. The transverse members can be assembled to the rods before the perimeter frame is assembled to the transverse members.

The middle transverse member 42 is located essentially at the middle of the basket, as measured lengthwise. An axle mounting tube 56 of substantially square cross section is disposed parallel and joined to the underside of intermediate segment 46 of this third transverse member 42. Such joining is preferably by welding, the tube 56 being of suitable metal. The tube is symmetrically arranged laterally so that it projects just slightly beyond each side of the basket. Metal end pieces 58 are joined to the ends of tube 56, again preferably by welding. Each end piece contains a circular hole 60 at a level below its point of attachment to tube 56. The two holes 60 are in substantial alignment, their axes being collinear and transverse to the length of the cart.

Wheel 24 removably mounts to the right end piece 58 and wheel 26 to the left end piece 58. Each wheel has its own axle so that the wheels can rotate independently of one another. The preferred wheels are wire-spoked types having a central hub 62 on which a rim 64 is concentrically supported by means of multiple taut wires 66. A threaded shaft extends from each hub and passes through the corresponding hole 60. The shaft could be a headed bolt whose shank is passed through the hub and into the corresponding hole 60. One or more nuts 61 are threaded onto the threaded end of the stub shaft at the inside of the corresponding end piece and tightened by a suitable tool to secure the wheel in place. A pneumatic tire 67 is supported on the wheel rim 64. The organization and arrangement results in the bottom of the basket having a nominal ground clearance, i.e. when the basket is level and on level ground, slightly greater than the radius of the wheels, the wheels being of equal diameters.

Details of the operating handle and strut assembly 28 aer seen in FIGS. 1–3 3 and 7–10. The operating handle is designated by the numeral 68 and the strut by the numeral 70. Handle 68 comprises a straight tubular member 72 of the same type and size tubular electrical conduit used in the basket. A shorter member 74, of the same tubular electrical conduit, is arranged transversely at one end of member 72 to form a pair of short handle bars on opposite sides of the member. As seen in FIGS. 1 and 3, the handle bars thus formed are preferably covered by elastomeric grips 76 for comfort in grasping. Member 72 joins to member 74 in the same fashion as the members 42 to perimeter frame 30. Triangular reinforcements 78 serve to strengthen the joint.

The opposite end of member 72 contains an attachment bracket 80. A second attachment bracket 82 is disposed on member 72 a short distance from bracket 80. These two brackets 80, 82 serve to cooperate with bracket structure 84 on the basket for removably mounting the assembly 28 on the basket. The bracket structure 84 on the basket comprises a first portion 86 mounted on the immediately adjacent, i.e. first, transverse member 42 and a second portion 88 mounted on side 36 of perimeter frame 32.

Attachment bracket 80 comprises a rectangular metal bar 90 at the end of member 72. Bar 90 is disposed transverse to the length of member 72 and is symmetrical with respect to the member. Triangular reinforcements 92 serve to strength the joint between the members, 72 and 90, the parts being once again joined by welding. A pair of end pieces 94 are attached to the ends of bar 90. They project away from the bar in the opposite direction from member 72 to form ears laterally spaced apart but laterally confronting each other. Each piece 94 contains a hole 96, the two holes being in alignment with each other. The structure of bar 90 and the two end pieces forms a bight for fitting onto the first portion 86 of bracket structure 84.

The bracket portion 86 comprises two pieces 98 forming ears which project downwardly from the member 42. The two ears 98 have aligned holes 100 and are spaced laterally apart, but slightly closer to each other than are pieces 94 to each other. This allows the aforementioned bight to fit over the ears 98 with pieces 94 overlapping ears 98 on the outside to bring holes 96 and 100 into alignment, one pair on one side, the other pair on the other side. The holes are of equal diameters for reception of pins 102 which are used to make the separable connection of the handle to the basket. An example of such a pin is shown in FIG. 10.

The pin comprises a nose end 104 containing a spring-loaded detent 106. The opposite end contains a wire 108 looped into a circle and passing through a small hole in the pin. When each pair of holes 96, 100 is aligned, a corresponding pin 102 can be inserted through them, nose end first. The spring-loaded detent is compressed during passage through the holes, but upon passing completly through, once again expands to an interference position to retain the pin in the holes. When an intentional pulling force is exerted on the pin via the wire ring, the resistance of the spring-loaded detent is overcome allowing the pin to be pulled out. This type of pin is particularly convenient for insertion and removal, and provides quite satisfactory retention when in use.

Bracket 82 has a central hole via which it fits onto member 72. The two parts 72, 82 are welded together around the hole. A first pair of laterally spaced ears 110 project to one side, and a second pair 112 to the opposite side. The first, or upper, pair of ears 110 contain aligned holes 114. With the bracket 80 pinned to the first portion 86 of bracket structure 84, member 72 can be swung upwardly about that pinned connection to fit ears 110 onto opposite sides of the second portion 88 of bracket structure 84. This second portion 88 of bracket structure 84 comprises a single downwardly directed ear which is located at the midpoint of side 36. It has a hole 116 which aligns with holes 114 allowing a third pin 102 to be passed through to make the removable connection thereby completing the removable attachment of the handle to the basket. With the handle so attached, the handle bars are disposed in upwardly and outwardly spaced relation to the basket at a level for convenient grasping by a typical individual.

FIG. 9 shows strut 70 by itself. It is a length of straight tubular electrical conduit 117, but of smaller diameter than member 72, and noticeably shorter. A hinge piece 118 having a hole 119 is attached to one end of conduit 117 and a cylindrical foot bar 120 is attached to the other end. A clevis 122 is attached centrally of bar 90 to project generally downwardly. It contains three pairs of parallel holes 125, 126, 128, one hole of each pair being in one side of the clevis and the other in the opposite side. The diameter of hole 119 is slightly larger than that of holes 124. The hinge piece 118 of the strut is received into the clevis and a dowel 130 is passed through the aligned holes 119, 124 to have a press fit with only holes 124. The strut is thereby pivotally mounted for swinging motion between a support position shown in broken lines in FIG. 2 and a stowed position shown in solid lines in the same FIG.

A stop pin 132 is pressed into holes 126 to span the clevis. It is disposed in the path of travel of the strut to limit the extent to which the strut can be swung downwardly, particularly defining a generally upright position for the strut when the strut is abutting the stop pin. The holes 128 are spaced from holes 126 a distance just slightly greater than the one half inch diameter of conduit 117. With the strut abutting the stop pin, a fourth pin 102 can be passed through holes 128 to span the clevis and hence prevent the strut from being swung upwardly away from its upright support position. This serves to lock the strut in place. After this fourth pin 102 has been removed, the strut can again be swung to the stowed position.

In the stowed position, conduit 117 is disposed between the lower ears 112, generally parallel with member 72. The ears have a pair of aligned holes 134 below the stowed strut and of the same size as holes 128. Having been removed from holes 128, the fourth pin 102 is now used to lock the strut in the stowed position by passing it through holes 134 to prevent the stowed strut from being swung downwardly.

From the foregoing description, the manner of operation of the cart should be reasonably apparent. When the cart is to be rolled either by pushing or pulling on the handle, the strut is preferably disengaged from the ground. A mere repositioning of the cart may not necessitate stowage of the strut if the strut is down. However, for movement over longer distances, the strut is usually retracted and stowed. Although the retraction and stowage of the strut is typically done manually, these procedures are quite convenient, particularly with use of the preferred pins 102.

The cart can be manipulated with relative convenience due to the independent axles for the two wheels and the appreciable road clearance. The handle gives good leverage for manipulation, and heavy loads can be transported with comparative ease when well balanced on the basket. The cart is especially useful in rough terrain, such as for hauling freshly killed game out of the woods. These functional attributes for hauling loads are embodied in a construction which nonetheless can be knocked down for convenient storage, such as in an automobile trunk or a pick-up truck, for transporting, or in a basement or garage. The construction is also conducive to a very attractive appearance, especially by painting and finishing. In practice, welding operation should be conducted with care to avoid sharp edges and excess weldment.

Representative dimensions are 36" for the length of the handle, and 45"×16"×8" for the basket. Since the disclosed construction for the basket will comprise significant spaces in the side and bottom of the basket, transport of a collection of smaller articles, such as pieces of camping gear, can be accomplished by using a liner 150 fitted to the basket as shown in FIG. 3. The liner covers the entire interior of the basket with its margin 152 wrapping around the perimeter frame and back into attachment with itself on the exterior. Such attachment is effected by any suitable separable means. The illustrated means of a series of snap fasteners 154 is especially convenient. The liner may be any suitable sheet-like material such as fabric or plastic.

While a preferred embodiment of the invention has been disclosed, it will be appreciated that principles are applicable to other embodiments.

What is claimed is:

1. A utility cart which is capable of transporting large loads along the ground, yet can be conveniently knocked down for storage and subsequent re-assembly, comprising a basket for carrying a load which is desired to be transported, said basket comprising a continuous rectangular perimeter frame having a longer dimension that is arranged lengthwise of the cart and a shorter dimension that is arranged transverse to the cart, said perimeter frame comprising a single length of tubular material comprising four integral, rounded 90 degree bends at particular locations along its length thereby forming integral longitudinal sides, integral transverse sides, and four integral, rounded 90 degree corners in the perimeter frame, said single length of tubular material having its opposite ends confronting and joined together, said basket further comprising a series of transverse members, also fabricated of tubular material, and arranged transversely of and at spaced apart locations along the cart's length, said transverse members having their opposite ends cut to generally semi-circular concave shapes to fit closely onto and join with substantially semi-circular shaped portions of the longitudinal sides of said perimeter frame and being shaped to cooperatively define a depression forming the basket, at least one tie extending lengthwise of the cart and joining to said transverse members at a level below that of said perimeter frame, an axle mount arranged transversely of the basket and joining to one of said transverse members such that the basket overlies the axle mount, axled wheels removably mounted on said axle mount and disposed alongside the opposite longer sides of the basket to support the cart for rolling motion along the ground, and a combination operating handle and strut assembly removably mounted on the basket at one lengthwise end thereof so as to be supported on the shorter side of the perimeter frame at said one lengthwise end of the basket and on the immediately adjacent transverse basket member, an operating handle of said assembly being disposed at an inclined angle to the plane of the perimeter frame to extend from said immediately adjacent transverse basket member past the shorter side of the perimeter frame at said one lengthwise end of the basket and terminate at a location which is spaced above the level of the perimeter frame and beyond said one lengthwise end of the basket, said assembly comprising a mounting for a strut providing a stowage position to which the strut is disposed when the cart is rolled along the ground so as to enable said one lengthwise end of the basket to be dropped down about the axled wheels relative to the opposite lengthwise end of the basket and said mounting providing a support position to which the strut is disposed when the cart is at rest for engaging the ground and cooperating with the wheels to provide stable support for the cart, said cart having a knock-down construction by which the cart can be knocked-down into (a) the basket including the axle mount, (b) the wheels, and (c) the combination operating handle and strut assembly.

2. A utility cart as set forth in claim 1 in which said tubular material for both said perimeter frame and said transverse members is electrical conduit of common diametrical dimension.

3. A utility cart as set forth in claim 2 in which each of said transverse members is shaped to comprise end segments which are perpendicular to the longer sides of said perimeter frame, an intermediate segment which is parallel to the shorter sides of said perimeter frame, and curved segments which join said intermediate segment to said end segments.

4. A utility cart as set forth in claim 3 in which said end segments of each transverse member are parallel with each other.

5. A utility cart as set forth in claim 3 in which there are plural such ties and one of said ties is a straight circular rod which extends through aligned holes in one set of corresponding curved segments of said transverse members and another of said ties is another straight circular rod which extends through aligned holes in the other set of corresponding curved segments, said rods joining with said transverse members.

6. A utility cart as set forth in claim 3 in which the ends of said transverse members are cut to generally semi-circular concave shapes to fit closely onto substantially a semi-circular portion of said perimeter frame.

7. A utility cart as set forth in claim 1 in which said axle mount comprises a tube whose overall length is greater than the width of the basket and which joins with a portion of said one transverse member which is parallel with and below the plane of said perimeter frame, the ends of said axle mount tube projecting beyond the sides of the basket, and end pieces attached to the ends of said axle mount tube at which the wheels are mounted, and the mounting of the wheels to the end pieces being by means of a separate axle for each wheel.

8. A utility cart as set forth in claim 7 in which the axles of said wheels lie on an axis which is below said axle mount tube, and the removable mounting of the wheels to the axle mount is accomplished by the removable mounting of each wheel to the corresponding end piece.

9. A utility cart as set forth in claim 8 in which said wheels comprise taut wire spokes that extend between a central hub and a rim and a pneumatic tire is disposed on the rim, the removable mounting of said wheels to said end pieces providing a ground clearance for said transverse members at least as great as the radii of said wheels.

10. A utility cart which is capable of transporting large loads along the ground, yet can be conveniently knocked down for storage and subsequent re-assembly, comprising a basket for carrying a load which is desired to be transported, said basket comprising a continuous rectangular perimeter frame having a longer dimension that is arranged lengthwise of the cart and a shorter dimension that is arranged transverse to the cart, said perimeter frame being fabricated of tubular material which is bent to 90 degrees at the four corners of the rectangle thereby causing the four corners of the rectangle to be rounded, said basket further comprising a series of transverse members, also fabricated of tubular material, and arranged transversely of and at spaced apart locations along the cart's length, said transverse members having their opposite ends joining to opposite lengthwise sides of said perimeter frame and being shaped to cooperatively define a depression forming the basket, at least one tie extending lengthwise of the cart and joining to said transverse members at a level below that of said perimeter frame, an axle mount arranged trasnversely of the basket and joining to one of said transverse members such that the basket overlies the axle mount, axled wheels removably mounted on said axle mount and disposed alongside the opposite longer sides of the basket to support the cart for rolling motion along the ground, and a combination operating handle and strut assembly removably mounted on the basket at one lengthwise end thereof so as to be supported on the shorter side of the perimeter frame at said one lengthwise end of the basket and on the immediately adjacent transverse basket member, an operating handle of said assembly being disposed at an inclined angle to the plane of the perimeter frame to extend from said immediately adjacent transverse basket member past the shorter side of the perimeter frame at said one lengthwise end of the basket and terminate at a location which is spaced above the level of the perimeter frame and beyond said one lengthwise end of the basket, said assembly comprising a mounting for a strut providing a stowage position to which the strut is disposed when the cart is rolled along the ground so as to enable said one lengthwise end of the basket to be dropped down about the axled wheels relative to the opposite lengthwise end of the basket and and said mounting providing a support position to which the strut is disposed when the cart is at rest for engaging the ground and cooperating with the wheels to provide stable support for the cart, said operating handle comprising a generally straight elongate member, fabricated of tubular material, and located laterally centrally of the cart, an attachment bracket attached to one end of said generally straight elongate member, a grasping handle attached to the opposite end of said generally straight elongate member, and a second attachment bracket attached to said straight member between said grasping handle and the first attachment bracket, said basket comprising attaching bracket structure on said perimeter frame and said immediately adjacent transverse member which cooperates with said first and second attachment brackets of said generally straight elongate member to enable said operating handle to be removably attached to said basket, and the removable mounting of said operating handle on the basket comprising separable fasteners separably securing said attaching bracket structure to said first and second attachment brackets to removably attach said operating handle to said basket.

11. A utility cart as set forth in claim 10 in which said separable fasteners are pins which pass through aligned holes in said attaching bracket structure and said first and second attachment brackets, each said pin having a nose end, a wire ring at the opposite end, and a spring-loaded detent adjacent the nose end which keeps the pin in the holes but which is releasable so that when a pull force is exerted on the pin via the wire ring, the pin can be pulled out of the holes.

12. A utility cart as set forth in claim 11 in which said attaching bracket structure comprises a first portion joined to said immediately adjacent transverse member and a second portion joined to the shorter side of said perimeter frame at said one end of the cart, said first attachment bracket having a pinned connection by means of such pins to said first portion of said attaching bracket structure at points located on laterally opposite sides of the center of the basket, and said second attachment bracket having a pinned connection by means of such a pin to said second portion of said attaching bracket structure at a point which is located laterally centrally of the basket.

13. A utility cart as set forth in claim 12 in which said pins are arranged with their axes parallel with each other and lying transversely of the cart.

14. A utility cart as set forth in claim 12 in which said first attachment bracket includes means for pivotal mounting of said strut about an axis transverse to the cart for enabling said strut to swing from its stowed position, in which it is disposed in cooperative association with said second attachment bracket and generally parallel with said operating member, downwardly to its support position, in which it is generally upright.

15. A utility cart as set forth in claim 14 in which said first attachment bracket includes a stop for the strut as it is swung downwardly from its stowed position to its upright position, and a common removable member is used in cooperative selective association with said attachment brackets for barring swinging of the strut from stowed position to the support position when the strut is in stowed position, and for barring swinging of the strut from the support position to the stowed position when the strut is in the support position.

16. A utility cart which is capable of transporting large loads along the ground, yet can be conveniently knocked down for storage and subsequent re-assembly, comprising a basket for carrying a load which is desired to be transported, said basket comprising a continuous rectangular perimeter frame having a longer dimension that is arranged lengthwise of the cart and a shorter dimension that is arranged transverse to the cart, said basket further comprising a series of transverse members arranged transversely of and at spaced apart locations along the cart's length, said transverse members having their opposite ends joining to opposite lengthwise sides of said perimeter frame and being shaped to cooperatively define a depression forming the basket, at least one tie extending lengthwise of the cart and joining to said transverse members at a level below that of said perimeter frame, an axle mount arranged transversely of the basket and joining to one of said transverse members such that the basket overlies the axle mount, axled wheels removably mounted on said axle mount and disposed alongside the opposite longer sides of the basket to support the cart for rolling motion along the ground, and a combination operating handle and strut assembly removably mounted on the basket at one lengthwise end thereof so as to be supported on the shorter side of the perimeter frame at said one lengthwise end of the basket and on the immediately adjacent transverse basket member, an operating handle of said assembly being disposed at an inclined angle to the plane of the perimeter frame to extend from said immediately adjacent transverse basket member past the shorter side of the perimeter frame at said one lengthwise end of the basket and terminate at a location which is spaced above the level of the perimeter frame and beyond said one lengthwise end of the basket, said assembly comprising a mounting for a strut providing a stowage position to which the strut is disposed when the cart is rolled along the ground so as to enable said one lengthwise end of the basket to be dropped down about the axled wheels relative to the opposite lengthwise end of the basket and said mounting providing a support position to which the strut is disposed when the cart is at rest for engaging the ground and cooperating with the wheels to provide stable support for the cart, said operating handle comprising an elongate member located laterally centrally of the cart, first and second attachment bracket structures spaced apart on said elongate member, means for separably attaching said operating handle to said basket via said first and second attachment bracket structures, said first attachment bracket structure serving for attachment of said elongate member to said immediately adjacent transverse basket member, said second attachment bracket structure serving for attachment of said elongate member to said shorter side of the perimeter frame at said one lengthwise end of the bracket, said mounting for the strut comprising means for pivotal mounting of the strut on a portion of said first attachment bracket structure, said first attachment bracket structure also comprising a stop for the strut as the strut is swung from stowed position to support position, and a locking member that is selectively operable with respect to said first attachment bracket structure to coact with said stop in locking the strut in support position when the strut is in support position.

17. A utility cart as set forth in claim 16 in which said locking member is a pin that is separably engaged with said first attachment bracket structure to lock the strut in supporting position by capturing the strut in supporting position between said stop and pin.

18. A utility cart as set forth in claim 16 in which said basket comprises attaching bracket structure on said shorter side of said frame at said one lengthwise end of the basket and on said immediately adjacent transverse basket member, said attaching bracket structure and said first and second attachment bracket structures comprising means providing for the removable mounting of said operating handle and strut assembly on said basket.

* * * * *